Patented Jan. 11, 1949

2,458,796

UNITED STATES PATENT OFFICE 2,458,796

PHENOL OXIDE RESIN LACQUERS AND THEIR MANUFACTURE

Gustav H. Ott, Riehen, and Wilhelm Kraus, Basel, Switzerland, assignors to Ciba Limited, Basel, Switzerland, a Swiss firm No Drawing. Application July 29, 1947, Serial No. 764,558. In Switzerland August 8, 1946

21 Claims. (Cl. 260—43)

The present invention relates to the preparation of lacquer raw material, the raw material itself as well as to lacquers made therewith and to objects treated with said lacquers.

It is known that resinous ethylene oxide derivatives contain at least two ethylene oxide groups, yield, with anhydrides of polybasic carboxylic acids or with basic catalysts, synthetic resins which may be used inter alia in the form of solutions as lacquers which are rapidly hardening and have a high adhesion capacity and good resistance capacity; see British Patents No. 518,057 and No. 579,698.

However, the lacquers prepared with basic catalysts generally gelatinize very rapidly and are only slightly useful for sensitive substrata, while the lacquers prepared with anhydrides of a polybasic carboxylic acids have the disadvantage of being very sensitive to moisture. The acid anhydride reacts with the water which may be present in the lacquer solution with formation of acid, which for some purposes is manifestly undesirable. It also reacts with alcohols which may be used as solvents or solvent additions and the hardening capacity of the lacquer is thereby impaired. Films prepared with such lacquers frequently do not possess the properties which are necessary for severe requirements, such as are encountered for example in the coating of metals.

It has moreover already been proposed, for adhesively uniting articles and particularly metals, to subject the aforenamed ethylene oxide resins in admixture with the various hardening agents to heat hardening between the surfaces to be adhesively joined. However, it has not heretofore been possible to obtain useful lacquers from these mixtures.

A primary object of the present invention is the embodiment of a process for the production of lacquer raw materials and, in turn, lacquers, which are free of the aforedescribed prior art deficiencies.

It has now been found, and the present invention is based on this development, that, by combining the ethylene oxide resins with dicyandiamide and certain ether resins, it is possible to prepare lacquer raw materials, which are soluble in the conventional lacquer solvents and yield lacquer coating which, on the one hand, are at least as good as those obtained from the aforementioned lacquers with respect to adherence to substrata of all kinds, such for example as polished metal surfaces, and on the other hand are free of the defects bound up with the said lacquers, the new lacquers being at least adequate from the standpoint of elasticity, insensitiveness to chemicals and resistance to boiling water.

It has also been found that the insensitiveness of the so-obtained lacquers as well as their elasticity can be improved by an addition of polyvalent phenols. In particular, such lacquers show a considerably increased resistance to fruit and vegetable preserves. Metal sheets coated with the lacquer may, moreover, be considerably elongated without injuring the lacquer coating.

Briefly stated, the present invention provides a process for the manufacture of lacquer raw materials, especially for fried lacquers, from resinous ethylene oxide derivatives of phenols, which is characterized by the fact that a resinous ethylene oxide derivative of a phenol, which derivative contains at least two ethylene oxide groups, is heated in the presence of a suitable solvent with dicyandiamide and an ether of an aldehyde, particularly formaldehyde, condensation product or the components from which it can be prepared and, in some cases, with a polyvalent phenol.

The ethylene oxide resins which may be used as starting materials are obtained in known manner by the action of the epihalagenhydrins or dihalogenhydrins, especially epichlorhydrin or dichlorahydrin, on phenols in alkaline medium.

The phenols which are useful for the purposes of this invention are those which contain at least two hydroxy groups. Those polynuclear phenols have been found to be particularly suitable, wherein the phenol nuclei are joined by carbon bridges, such for example as 4,4'-dihydroxydiphenyl-dimethylmethane, 4,4'-dihydroxydiphenyl-methylmethane and 4,4'-dihydroxydipenylmethane. The ethylene oxide obtained from these typical compounds are hereinafter designated, in brief, as dimethylmethane-, methylmethane- and methane-resins.

In admixture with the named polynuclear phenols, use may also be made of those polynuclear phenols wherein the phenol nuclei are joined by sulfur bridges, such for example as 4,4'-dihydroxydiphenylsulfone.

However, other polyvalent phenols may also be used, as for example resorcinol, hydroquinone and the like, Experience has shown that best results are obtained with the dimethylmethane-resins, but the lacquers obtained from the other resins are quite satisfactory for many purposes.

Ethers of aldehyde condensation products, which can be used according to the invention, comprise the ethers, particularly the alkyl ethers, of formaldehyde condensation products, particularly methylol compounds of melamine, urea, dicyandiamide, phenol and the like. However, the alkyl ethers of methylol-melamines and methylolureas are of particular importance. The ether resins may be used either in their finished form or they may be formed from their components during the process of the invention, care being taken to keep within the reaction conditions which favor the ether resin formation and which are in themselves known.

For carrying out the process, the ethylene oxide resins may first be dissolved in a suitable solvent and then the other components added to the solution. As particularly suitable solvents there are mentioned by way of example: 2-methyl-pentandiole-(2:4), diacetone alcohol, toluene, o-dichlorobenzene, cyclohexanone, cyclohexanol or the like, as well as mixtures of such solvents. However, it is also possible to mix and heat the three components with the solvent. It is also possible to combine the ethylene oxide resin with a mixture of dicyandiamide, ether resin and solvent and then to heat. It may also be suitable first to condense at elevated temperature the ethylene oxide resin, in solution in the solvent, with about 3-4% (relative to the weight of ethylene oxide resin) of dicyandiamide and then to heat with neutral ether resin and an additional 3-6% (relative to the weight of ethylene oxide resin) of dicyandiamide, if necessary in the presence of additional solvents such as alcohols, for example ethanol, propanol, butanol, etc.

The quantity of the dicyandiamide to be employed depends on the kind of ethylene oxide resin used and also on the desired properties of the end product. It may vary within wide limits but, as a rule, is about 2-20 per cent., preferably 6-10 per cent., of the quantity of ethylene oxide resin used. Care must be taken to ensure complete incorporation of the dicyandiamide into the resin solution by the presence of a sufficient quantity of ether resin.

As polyvalent phenols which are suitable for improving the lacquer prepared according to the invention, particularly in respect of elasticity and insensitiveness to chemicals, the same ones may be used as were above enumerated as starting materials for the ethylene oxide resins. Particularly valuable for this purpose are again the polyvalent phenols wherein phenolic nuclei are joined by a carbon bridge, such for example as 4,4'-dihydroxydiphenyl-dimethylmethane, 4,4'-dihydroxydiphenyl-methylmethane, 4,4'-dihydroxydiphenyl-methane, etc. However, other polyvalent phenols, such for example as resorcinol or hydroquinone, may also be used. The addition of these phenols may take place at any suitable point of time during the preparation of the lacquer. For example, the polyvalent phenol may be added at the start to the solution of the ethylene oxide resin, in some cases with a part of the dicyandiamide, or else the polyvalent phenol may be fused together with the ethylene oxide resin and the resultant melt dissolved in a suitable solvent and then further worked up with dicyandiamide and ether resin. The admixture of the polyvalent phenol may also be successfully carried out in a later phase of the manufacture of the lacquer or with the finished lacquer. The amount of the addition of polyvalent phenol may vary within wide limits. When using 4,4'-dihydroxydiphenyl-dimethylmethane, an addition of, e. g., 25-30%, calculated relative to the quantity of ethylene oxide resin used, has been found to be particularly suitable.

In many fields of application and especially in coating preserving containers, lacquers which are colored yellow to brown (so called gold lacquers) are preferred over the colorless lacquers (so-called silver lacquers), because the color makes possible a simple inspection of the treated surface. In this connection, it has been found that the lacquer films of the present invention can, depending upon the constitution or purity of the starting material, be obtained in completely colorless form or colored up to a golden brown. It is thus possible, according to the invention, to prepare so-called gold lacquer as well as silver lacquer. Of course, by adding coloring materials, the lacquers can be prepared in any desired color. Furthermore, softening agents can be added thereto if desired.

The following examples describe the invention in greater detail, without limiting the same to the particularities set forth therein. The parts are by weight. α-Dichlorhydrine was used in making the ethylene oxide resins of Examples 1-12, whereas to make those of the other examples, epichlorhydrine was used.

*Example 1*

32.94 parts of dimethylmethane-resin are brought into solution with 27.55 parts of cyclohexanol, 3.29 parts of cyclohexanone, 9.18 parts of o-dichlorobenzene and 3.29 parts of toluene at 90-100° C. After filtration through filtering earth, the clear solution is heated under a reflux condenser to 100° C. for 30 minutes with 1.32 parts of dicyandiamide (corresponding to 4% of the resin used) while stirring, the dicyandiamide being substantially taken up. The reaction mass is then stirred for 10 minutes at about 100° C. with a further 1.68 parts of dicyandiamide (corresponding to 5% of the quantity of dimethylmethane-resin used), and 5.7 parts of a approximately 75% solution of hexamethylolmelamine-butylether in butanol and 0.1 part of 25% aqueous ammonia are added to the resultant slime. The mass is then heated at 100° C. until all the components are completely dissolved, which takes about 1-1½ hours. Depending upon requirements, the reaction product which is of relatively low viscosity can be further condensed for some time in order to attain a higher viscosity. Finally, filtration is effected. There are obtained about 100 parts of a lacquer resin solution which is wholly neutral and has a dry content of about 40%.

This lacquer solution, diluted with a conventional lacquer solvent such as acetone or the like, may be applied by the spraying, roller applicator or brush applicator processes and may be subjected to thermal hardening at a firing temperature of preferably about 100-200° C. and for a firing period of 1-2 hours. A coating prepared in this manner has a high adhesion on rough as well as on polished surfaces. It is colorless and odorless and, notwithstanding great hardness, it has good stamping and deep drawing quality, i. e. metal sheets or the like coated with this lacquer can, without injury to the lacquer coating, be stamped or drawn into shaped articles. It is not attacked by organic solvents, motor fuels, oils, fats, alkalies, acids, etc. It is stable to boiling water. No subsequent turning to yellow takes place.

The surprising insensitiveness to chemicals of the obtained lacquer films and their elasticity make the lacquer raw material suitable for the preparation of protective coatings on metal, particularly light metal, for example preserving cans. It makes possible the production in a simple manner of an invisible "sealing" on anodically oxidized aluminum.

Example 2

61 parts of dimethylmethane-resin are dissolved in 40 parts of cyclohexanol, 10 parts of o-dichlorobenzene, 5 parts of cyclohexanone and 6 parts of toluene and the solution stirred for 40 minutes at 120° C. with 1.83 parts of dicyandiamide.

Then 3.66 parts of dicyandiamide, 8.00 parts of an approximately 75% solution of methylolurea-butylether in butanol and 22 parts of butanol are added and stirred at 120° C. for 70 minutes, whereby a homogeneous resin solution is obtained. After dilution with a conventional lacquer solvent, such as acetone or the like, this yields a silver lacquer which can, at 220° C., be fired within 15 minutes to a bright, highly-elastic, colorless lacquer coating which otherwise possesses the properties of the lacquer coating described in Example 1.

Example 3

20 parts of dimethylmethane-resin, 10 parts of a cresol-aldehyde condensation product (prepared in known manner from 110 parts of raw cresol, 200 parts of aqueous formaldehyde of 30% strength and 6 parts of aqueous ammonia of 25% strength, and etherified with cyclohexanol), 20 parts of cyclohexanol and 1.2 parts of dicyandiamide are condensed under reflux for 30 minutes at 100–110° C. The obtained resin solution is diluted with a solvent or solvents used in the lacquer art to form a lacquer which is ready for use. Thermal hardening for 20 minutes at 200° C. gives a yellowish elastic lacquer coating which is stable to boiling water.

Example 4

366 parts of dimethylmethane-resin, 300 parts of butanol, 300 parts of o-dichlorobenzene and 4 parts of aqueous ammonia of 25% strength are boiled under reflux for 3 hours, stirred for 2¾ hours at 117° C. with 37 parts of dicyandiamide, 110 parts of an approximately 75% solution of methylolurea-butylether in butanol and 2.4 parts of caustic potash solution of 25° Bé., all the components going into solution. In order to realize a high viscosity, the solution is stirred for 45 more minutes at this temperature and then diluted with 150 parts of o-dichlorobenzene and 150 parts of benzyl alcohol to form a lacquer solution having a dry content of about 35%. This is worked up by thermal hardening to a highly elastic, colorless lacquer coating.

Example 5

A solution of 37 parts of crude methane-resin in 20 parts of o-dichlorobenzene and 20 parts of cyclohexanol is heated for 10 minutes at 120–130° C. with 1.5 parts of dicyandiamide. To this solution there is added a solution, prepared at 100° C., of 1.5 parts of dicyandiamide and 8 parts of methylolmelamine-butylether in 26 parts of butanol, and the mixture is condensed under reflux for 10 minutes at 100–105° C. The obtained solution is filtered and diluted with conventional lacquer solvents to form a ready-to-use lacquer solution.

The lacquer film obtained therewith is colored golden brown and has very good stability toward chemicals.

Example 6

7.5 parts of an ethylene oxide resin, obtained in known manner from 120 parts of resorcinol and 260 parts of glycerine-α-dichlorhydrin in alkaline medium, are dissolved in 4 parts of cyclohexanol and 4 parts of o-dichlorobenzene, and the solution condensed for ten minutes at 120–140° C. with 0.3 part of dicyandiamide.

The resultant mixture is boiled for 15 minutes with a solution of 0.3 part of dicyandiamide, 5.2 parts of butanol and 1.6 parts of methylolmelamine-butylether, and the obtained solution diluted to 20% dry content with a lacquer solvent mixture. This lacquer solution gives, upon firing, a colorless elastic coating.

Example 7

37 parts of methylmethane-resin are worked up, according to the method described in Example 5, into a ready-to-use lacquer solution, which can be fired to an elastic, pore-free and colorless coating.

Example 8

208 parts of dimethylmethane-resin are dissolved in 303 parts of o-dichlorobenzene and the obtained solution is heated for 30 minutes at 90–110° C. with 8.3 parts of dicyandiamide and 68 parts of crude 4,4'-dihydroxydiphenyl-dimethylmethane. Then 9.3 parts of dicyandiamide, 40 parts of an approximately 80% solution of hexamethylolmelamine methylether in ethanol and 170 parts of propanol are added and the obtained mixture is stirred at 90–120° C. until a clear solution is formed. There are obtained 800 parts of a lacquer solution which is neutral and has a dry content of about 40%. Fired at 220° C. for 30 minutes, it gives a lustrous golden yellow, pore-free coating.

It has in general the properties of the lacquer coating obtained according to Example 1, but in comparison with the latter has enhanced elasticity and enhanced resistance to fruit and vegetable preserves. A coating produced on a metal sheet can be drawn out with the metal to an extent of about 30-50% of its original dimensions, without injury. With respect to boiling tomato concentrate, which is used as a very aggressive test substance for certain lacquers, the present lacquer film shows a two- or three-fold increased resistance, as compared to a lacquer film prepared without addition of 4,4' - dihydroxydiphenyldimethylmethane.

Example 9

66 parts of dimethylmethane-resin are fused for 15 minutes at 160° C. with 20 parts of crude 4,4'-dihydroxydiphenyl-dimethylmethane to form a homogeneous resin body which is of breakable hardness and can be dissolved in the conventional lacquer solvents. The obtained resin is dissolved with 56 parts of cyclohexanol, 6.6 parts of cyclohexanone, 12.4 parts of o-dichlorobenzene and 6.6 parts of toluene and the solution condensed for 30 minutes at 100° C. with 2.64 parts of dicyandiamide, a clear resin solution being formed. It is then stirred, while being boiled under reflux for a further 90 minutes at 100–105° C. with 2.64 parts of dicyandiamide, 18.4 parts of an approximately 75% solution of methylolmelamine-butylether in butanol, 0.2 part of 25% aqueous ammonia and 35 parts of propyl alcohol, a clear resin solution with a dry content of about 45% being formed.

Lacquer films prepared therefrom have a golden yellow color, good resistance to chemicals and excellent elasticity.

Example 10

200 parts of the lacquer resin prepared according to Example 1 are mixed with 20 parts of crude 4,4'-dihydroxydiphenyl-dimethylmethane and heated to 75–80° C. for 15 minutes. There results a clear lacquer solution which yields a golden yellow, pore-free coating.

Example 11

200 parts of dimethyl-methane resin are dissolved at a raised temperature in 200 parts of diacetone alcohol and 8 parts of dicyandiamide, 10 parts of hexamethylol-melamine butyl ether, 15 parts of propanol and 0.6 part of adipic acid added, whereupon the mixture is heated at 90–100° C. until a clear resin solution of medium viscosity is formed.

A lacquer made from it and any solvent customarily used in the lacquer industry can be fired at 140–200° C. to form a highly elastic film which is very stable towards acids and alkalis.

Example 12

200 parts of dimethyl-methane resin are dissolved in 180 parts of diacetone alcohol. There are mixed with this solution 10 parts of hexamethylol melamine butyl ether, 8 parts of dicyandiamide, 15 parts of propanol and 0.8 part of glacial acetic acid and the mixture heated at 80–100° C. until a clear resin solution of medium viscosity is formed.

It may be dissolved in the usual lacquer solvent and, after hardening in an oven forms a highly elastic film which is resistant to bending and scratching.

Example 13

200 parts of dimethylmethane resin are dissolved in 200 parts of diacetone alcohol at 80–100° C. The clear resin solution is heated at 80–100° C. with 8 parts of dicyandiamide, 8 parts of hexamethylol melamine butyl ether, 12 parts of propanol and 0.4 part of oxalic acid until all components are dissolved. The low viscosity of the reaction product can be increased by condensing it somewhat longer.

Example 14

200 parts of dimethyl-methane resin are dissolved at 100° C. in 105 parts of diacetone alcohol and 30 parts of cyclohexanol. The solution is slightly acidified with 0.8 part of adipic acid and then heated with a mixture of 55 parts of hexamethylol melamine butyl ether, 136 parts of propanol and 22 parts of dicyandiamide at 80–100° C. until all components are dissolved. A solution of 100 parts of dimethyl methane resin in 100 parts of diacetone alcohol is then added and stirred for a short while at 60–100° C. Hardening in an oven at 220° C. for 30 minutes yields a yellowish, highly elastic film which is very resistant to chemicals.

Example 15

400 parts of dimethyl-methane resin are dissolved in 180 parts of diacetone alcohol at 90–100° C. There are added to the clear solution 8 parts of dicyandiamide, 80 parts of propanol, 8 parts of hexamethylol melamine butyl ether, 30 parts of cyclohexanol and 0.8 part of benzoic acid. The mixture is heated at 80–95° C. until all components are dissolved. A resin solution of low viscosity is formed. The viscosity can be increased to any degree by further heating the resin solution at 90–100° C.

When fired at 200° C. for 60 minutes in an oven, a solution of this lacquer in any lacquer solvent yields a slightly yellowish, highly elastic film which is very resistant to fruit preserves.

Example 16

400 parts of dimethyl-methane resin are dissolved at a raised temperature in 180 parts of diacetone alcohol. There are added to the clear solution 80 parts of dicyandiamide, 200 parts of hexamethylol melamine butyl ether, 180 parts of propanol, 30 parts of cyclohexanol and 1 part of glacial acetic acid and this mixture is heated for 3–4 hours at 90–100° C. To the resultant highly viscous resin solution 100 parts of diacetone alcohol and 100 parts of propanol are added and the mixture stirred for 30 minutes.

When hardened in an oven, the lacquer prepared with a customary solvent yields a pale-colored, highly elastic film.

Example 17

200 parts of dimethyl-methane resin are dissolved in 150 parts of diacetone alcohol. There are added to the clear solution 16.8 parts of dicyandiamide, 9 parts of paraformaldehyde, 60 parts of propanol and 0.5 part of oxalic acid, whereupon the whole is heated at 80–100° C. until a clear resin solution of medium viscosity is formed.

When hardened in an oven, the lacquer prepared with a customary solvent yields a highly elastic lacquer film.

Example 18

400 parts of dimethyl-methane resin are dissolved in a mixture of 260 parts of diacetone alcohol and 20 parts of toluene. The clear solution is then condensed at 80–100° C. with 16 parts of dicyandiamide, 10 parts of paraformaldehyde, 120 parts of propanol, 40 parts of 2-methyl-pentane diol-(2,4) and 0.8 part of oxalic acid until a clear, highly viscous resin solution is formed.

When dissolved in a usual lacquer solvent, a lacquer is obtained which yields, when fired in an oven, a highly elastic lacquer film which is scratch resistant.

What we claim is:

1. A process for the preparation of a lacquer raw material, especially for fired lacquers, from a resinous ethylene oxide derivative of a phenol, wherein an ethylene oxide derivative of a phenol, which derivative contains at least two ethylene oxide groups, is heated in the presence of a suitable solvent with dicyandiamide and an ether of a formaldehyde condensation product of a substance of the group consisting of melamine, urea, dicyandiamide and phenol.

2. A process for the preparation of a lacquer raw material, especially for fired lacquers, from a resinous ethylene oxide derivative of a phenol, wherein an ethylene oxide derivative of a polynuclear phenol of which the phenolic nuclei are connected together by a carbon bridge, which derivative contains at least two ethylene oxide groups, is heated in the presence of a suitable solvent with dicyandiamide and an ether of a formaldehyde condensation product of a substance of the group consisting of melamine, urea, dicyandiamide and phenol.

3. A process for the preparation of a lacquer raw material, especially for fired lacquers, from a resinous ethylene oxide derivative of a phenol, wherein an ethylene oxide derivative of 4,4'-dihydroxydiphenyl-dimethylmethane, which derivative contains at least two ethylene oxide groups, is heated in the presence of a suitable solvent with dicyandiamide and an ether of a formaldehyde condensation product of a substance of the group consisting of melamine, urea, dicyandiamide and phenol.

4. A process for the preparation of a lacquer raw material, especially for fired lacquers, from a resinous ethylene oxide derivative of a phenol, wherein an ethylene oxide derivative of a phenol, which derivative contains at least two ethylene oxide groups, is heated in the presence of a suitable solvent with dicyandiamide and an alkyl ether of a formaldehyde condensation product of a substance of the group consisting of melamine, urea, dicyandiamide and phenol.

5. A process for the preparation of a lacquer raw material, especially for fired lacquers, from a resinous ethylene oxide derivative of a phenol, wherein a ethylene oxide derivative of a polynuclear phenol of which the phenolic nuclei are connected together by a carbon bridge, which derivative contains at least two ethylene oxide groups, is heated in the presence of a suitable solvent with dicyandiamide and an alkyl ether of a formaldehyde condensation product of a substance of the group consisting of melamine, urea, dicyandiamide and phenol.

6. A process for the preparation of a lacquer raw material, especially for fired lacquers, from a resinous ethylene oxide derivative of a phenol, wherein an ethylene oxide derivative of 4,4'-dihydroxydiphenyl-dimethylmethane, which derivative contains at least two ethylene oxide groups, is heated in the presence of a suitable solvent with dicyandiamide and an alkyl ether of a formaldehyde condensation product of a substance of the group consisting of melamine, urea, dicyandiamide and phenol.

7. A process for the preparation of a lacquer raw material, especially for fired lacquers, from a resinous ethylene oxide derivative of a phenol, wherein an ethylene oxide derivative of a phenol, which derivative contains at least two ethylene oxide groups, is heated in the presence of a suitable solvent with dicyandiamide and an ether of a formaldehyde condensation product of a substance of the group consisting of melamine, urea, dicyandiamide and phenol, said ether compound being formed in the course of the process from its starting components.

8. A process for the preparation of a lacquer raw material, especially for fired lacquers, from a resinous ethylene oxide derivative of a phenol, wherein an ethylene oxide derivative of a phenol, which derivative contains at least two ethylene oxide groups, is heated in the presence of a suitable solvent with dicyandiamide and an ether of a formaldehyde condensation product of a substance of the group consisting of melamine, urea, dicyandiamide and phenol, a solution of said ethylene oxide derivative being first condensed with a part of the dicyandiamide and then heated with a further quantity of dicyandiamide and with the said ether compound.

9. A process for the preparation of a lacquer raw material, especially for fired lacquers, from a resinous ethylene oxide derivative of a phenol, wherein an ethylene oxide derivative of a phenol, which derivative contains at least two ethylene oxide groups, is heated in the presence of a suitable solvent with dicyandiamide and an ether of a formaldehyde condensation product of a substance of the group consisting of melamine, urea, dicyandiamide and phenol, a solution of said ethylene oxide derivative being first condensed with a part of the dicyandiamide and then heated with a further quantity of dicyandiamide and with the said ether compound in presence of an additional amount of a suitable solvent.

10. A process for the preparation of a lacquer raw material, especially for fired lacquers, from a resinous ethylene oxide derivative of a phenol, wherein an ethylene oxide derivative of a phenol, which derivative contains at least two ethylene oxide groups, is heated in the presence of a suitable solvent with dicyandiamide and an ether of a formaldehyde condensation product of a substance of the group consisting of melamine, urea, dicyandiamide and phenol, a polyvalent phenol being added at any stage of the process.

11. A process for the preparation of a lacquer raw material, especially for fired lacquers, from a resinous ethylene oxide derivative of a phenol, wherein an ethylene oxide derivative of a phenol, which derivative contains at least two ethylene oxide groups, is heated in the presence of a suitable solvent with dicyandiamide and an ether of a formaldehyde condensation product of a substance of the group consisting of melamine, urea, dicyandiamide and phenol, a polynuclear phenol, of which the phenolic nuclei are connected together by a carbon bridge, being added in any stage of the process.

12. A process for the preparation of a lacquer raw material, especially for fired lacquers, from a resinous ethylene oxide derivative of a phenol, wherein an ethylene oxide derivative of a phenol, which derivative contains at least two ethylene oxide groups, is heated in the presence of a suitable solvent with dicyandiamide and an ether of a formaldehyde condensation product of a substance of the group consisting of melamine, urea, dicyandiamide and phenol, 4,4'-dihydroxydiphenyl-dimethylmethane being added at any stage of the process.

13. A lacquer raw material, especially for fired lacquers, consisting of (1) a reaction product of (a) a resinous ethylene oxide derivative of a phenol, which derivative contains at least two ethylene oxide groups (b) dicyandiamide and (c) an ether of a formaldehyde condensation product of a substance of the group consisting of melamine, urea, dicyandiamide and phenol, and (2) a suitable solvent.

14. A lacquer raw material, especially for fired lacquers, consisting of (1) a reaction product of (a) a resinous ethylene oxide derivative of a polynuclear phenol of which the phenolic nuclei are connected together by a carbon bridge which derivative contains at least two ethylene oxide groups, (b) dicyandiamide and (c) an ether of a formaldehyde condensation product of a substance of the group consisting of melamine, urea, dicyandiamide and phenol, and (2) a suitable solvent.

15. A lacquer raw material, especially for fired lacquers, consisting of (1) a reaction product of (a) a resinous ethylene oxide derivative of a 4,4'-dihydroxydiphenyl-dimethylmethane which derivative contains at least two ethylene oxide groups, (b) dicyandiamide and (c) an ether of a formaldehyde condensation product of a substance of the group consisting of melamine, urea, dicyandiamide and phenol, and (2) a suitable solvent.

16. A lacquer raw material, especially for fired lacquers, consisting of (1) a reaction product of (a) a resinous ethylene oxide derivative of a phenol which derivative contains at least two ethylene oxide groups, (b) dicyandiamide and (c) an alkyl ether of a formaldehyde condensation product of a substance of the group consisting of melamine, urea, dicyandiamide and phenol, and (2) a suitable solvent.

17. A lacquer raw material, especially for fired lacquers, consisting of (1) a reaction product of (a) a resinous ethylene oxide derivative of a polynuclear phenol of which the phenolic nuclei are connected together by a carbon bridge which derivative contains at least two ethylene oxide groups, (b) dicyandiamide and (c) an alkyl ether of a formaldehyde condensation product of a substance of the group consisting of melamine, urea, dicyandiamide and phenol, and (2) a suitable solvent.

18. A lacquer raw material, especially for fired lacquers, consisting of (1) a reaction product of (a) a resinous ethylene oxide derivative of 4,4'-dihydroxydiphenyl-dimethylmethane which derivative contains at least two ethylene oxide groups, (b) dicyandiamide and (c) an alkyl ether of a formaldehyde condensation product of a substance of the group consisting of melamine, urea, dicyandiamide and phenol, and (2) a suitable solvent.

19. A lacquer raw material, especially for fired lacquers, consisting of (1) a reaction product of (a) a resinous ethylene oxide derivative of a phenol which derivative contains at least two ethylene oxide groups, (b) dicyandiamide and (c) an ether of a formaldehyde condensation product of a substance of the group consisting of melamine, urea, dicyandiamide and phenol, and (2) a suitable solvent, the lacquer raw material containing an addition of a polyvalent phenol.

20. A lacquer raw material, especially for fired lacquers, consisting of (1) a reaction product of (a) a resinous ethylene oxide derivative of a phenol which derivative contains at least two ethylene oxide groups, (b) dicyandiamide and (c) an ether of a formaldehyde condensation product of a substance of the group consisting of melamine, urea, dicyandiamide and phenol, and (2) a suitable solvent, the lacquer raw material containing an addition of a polynuclear phenol of which the phenolic nuclei are connected together by a carbon bridge.

21. A lacquer raw material, especially for fired lacquers, consisting of (1) a reaction product of (a) a resinous ethylene oxide derivative of a phenol which derivative contains at least two ethylene oxide groups, (b) dicyandiamide and (c) an ether of a formaldehyde condensation product of a substance of the group consisting of melamine, urea, dicyandiamide and phenol, and (2) a suitable solvent, the lacquer raw material containing an addition of 4,4'-dihydroxydiphenyl-dimethylmethane.

GUSTAV H. OTT.
WILHELM KRAUS.

No references cited.